(12) United States Patent
Kim et al.

(10) Patent No.: US 9,930,312 B2
(45) Date of Patent: Mar. 27, 2018

(54) APPARATUS AND METHOD OF PROCESSING DEPTH IMAGE USING RELATIVE ANGLE BETWEEN IMAGE SENSOR AND TARGET OBJECT

(71) Applicant: SAMSUNG ELECTRONICS CO., LTD., Suwon-si, Gyeonggi-do (KR)

(72) Inventors: Nam Joon Kim, Seoul (KR); Byung In Yoo, Seoul (KR); Sung Joo Suh, Seoul (KR); Chang Kyu Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 328 days.

(21) Appl. No.: 14/055,369

(22) Filed: Oct. 16, 2013

(65) Prior Publication Data

US 2014/0333722 A1    Nov. 13, 2014

(30) Foreign Application Priority Data

May 13, 2013    (KR) .......................... 10-2013-0053800

(51) Int. Cl.
*H04N 13/00*     (2018.01)
*G06T 3/00*      (2006.01)
*G06T 19/20*     (2011.01)
*G06T 7/73*      (2017.01)

(52) U.S. Cl.
CPC ........... *H04N 13/0022* (2013.01); *G06T 3/00* (2013.01); *G06T 7/73* (2017.01); *G06T 19/20* (2013.01); *G06T 2207/10028* (2013.01); *G06T 2207/30244* (2013.01); *G06T 2219/2016* (2013.01)

(58) Field of Classification Search
CPC ............ G06T 2219/2016; G06T 19/20; G06T 2207/10028
See application file for complete search history.

(56) References Cited

U.S. PATENT DOCUMENTS

| | | | |
|---|---|---|---|
| 7,177,445 B2 * | 2/2007 | Brodsky | G06K 9/38 348/154 |
| 8,606,645 B1 * | 12/2013 | Applefeld | G06Q 30/02 705/14.25 |
| 2005/0259890 A1 * | 11/2005 | Lutes | G06T 7/73 382/293 |
| 2008/0247670 A1 | 10/2008 | Tam et al. | |
| 2010/0278431 A1 * | 11/2010 | Mathe | G06K 9/00201 382/190 |
| 2010/0302365 A1 | 12/2010 | Finocchio et al. | |

(Continued)

FOREIGN PATENT DOCUMENTS

| | | |
|---|---|---|
| EP | 2 061 005 | 11/2008 |
| JP | 2008-309631 | 12/2008 |
| KR | 10-2011-0116325 | 10/2011 |

*Primary Examiner* — William C Vaughn, Jr.
*Assistant Examiner* — Jerry Jean Baptiste
(74) *Attorney, Agent, or Firm* — NSIP Law

(57) ABSTRACT

An apparatus for processing a depth image using a relative angle between an image sensor and a target object includes an object image extractor to extract an object image from the depth image, a relative angle calculator to calculate a relative angle between an image sensor used to photograph the depth image and a target object corresponding to the object image, and an object image rotator to rotate the object image based on the relative angle and a reference angle.

20 Claims, 13 Drawing Sheets

(56) References Cited

U.S. PATENT DOCUMENTS

| | | | |
|---|---|---|---|
| 2011/0090311 A1* | 4/2011 | Fang | H04N 7/15 348/43 |
| 2011/0102438 A1 | 5/2011 | Mathe et al. | |
| 2012/0099762 A1* | 4/2012 | Kunieda | G06K 9/00248 382/103 |
| 2012/0163669 A1 | 6/2012 | Mathe et al. | |
| 2013/0190087 A1* | 7/2013 | Somarajapuram | A63F 13/10 463/32 |
| 2014/0267610 A1* | 9/2014 | Ahmad | G06K 9/00201 348/46 |
| 2014/0375691 A1* | 12/2014 | Kasahara | G06T 11/60 345/633 |

* cited by examiner

APPARATUS AND METHOD OF PROCESSING DEPTH IMAGE USING RELATIVE ANGLE BETWEEN IMAGE SENSOR AND TARGET OBJECT

CROSS-REFERENCE TO RELATED APPLICATIONS

This application claims the priority benefit of Korean Patent Application No. 10-2013-0053800, filed on May 13, 2013, in the Korean Intellectual Property Office, the disclosure of which is incorporated herein by reference.

BACKGROUND

1. Field

One or more embodiments relate to an apparatus and method of processing a depth image, and more particularly, to a technology for processing a depth image using a relative angle between an image sensor and a target object.

2. Description of the Related Art

Recently, interest in technology for estimating a motion of a target object in a real space, for example, a human body, and implementing the estimated motion in a three-dimensional (3D) space, in fields such as video games, virtual worlds, and computer graphics (CG) in movies, is increasing.

In particular, many devices, for example, smart TVs, smart phones, and healthcare equipment, may recognize a motion of a target object using a depth image. Here, the depth image refers to an image including a depth from a depth image camera to a target object.

SUMMARY

The foregoing and/or other aspects are achieved by one or more embodiments of an apparatus for processing a depth image The apparatus may include a depth image obtainer to obtain a depth image, an object image extractor to extract an object image from the depth image, a relative angle calculator to calculate a relative angle between an image sensor used to photograph the depth image and a target object corresponding to the object image, and an object image rotator to rotate the object image based on the relative angle and a reference angle, the reference angle being related to reference images prepared in advance to recognize the object image. Here, the reference angle may include an angle between the image sensor used to photograph the reference images and reference objects corresponding to the reference images.

The object image rotator may include a Cartesian coordinate converter to convert a coordinate system of the object image to a Cartesian coordinate system, a rotation center calculator to calculate a rotation center of the object image in the Cartesian coordinate system, a rotator to rotate the object image on the rotation center to match the relative angle to the reference angle in the Cartesian coordinate system, and a projective coordinate converter to convert the coordinate system of the object image to a projective coordinate system.

The apparatus for processing a depth image may further include an object image refiner to refine the rotated object image. Here, the object image refiner may include a filler to fill empty spaces included in the rotated object image based on at least one of an interpolation method and a filtering method.

The relative angle calculator may include at least one of a floor detector to estimate the relative angle by detecting a floor included in the depth image, a principal component analyzer to estimate the relative angle by analyzing principal components included in the depth image, and a gyro analyzer to estimate the relative angle by using a gyro sensor included in the image sensor.

The foregoing and/or other aspects are achieved by one or more embodiments of a method of processing a depth image The method may include obtaining a depth image, extracting an object image from the depth image, calculating a relative angle between an image sensor used to photograph the depth image and a target object corresponding to the object image, and rotating the object image based on the relative angle and a reference angle, the reference angle being related to reference images prepared in advance to recognize the object image.

Here, the method of processing a depth image may further include filling empty spaces included in the rotated object image based on at least one of an interpolation method and a filtering method to refine the rotated object image.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
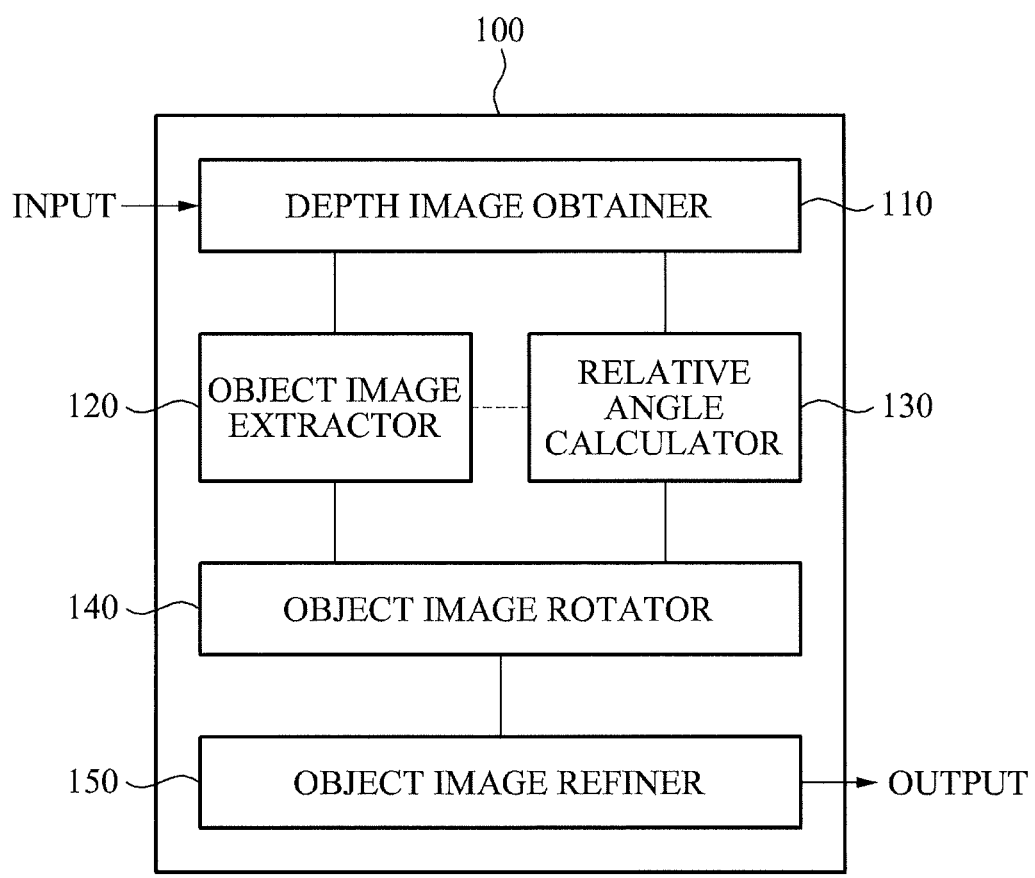
FIGS. 1 to 3 illustrate block diagrams of an apparatus for processing a depth image according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Figure 2A:
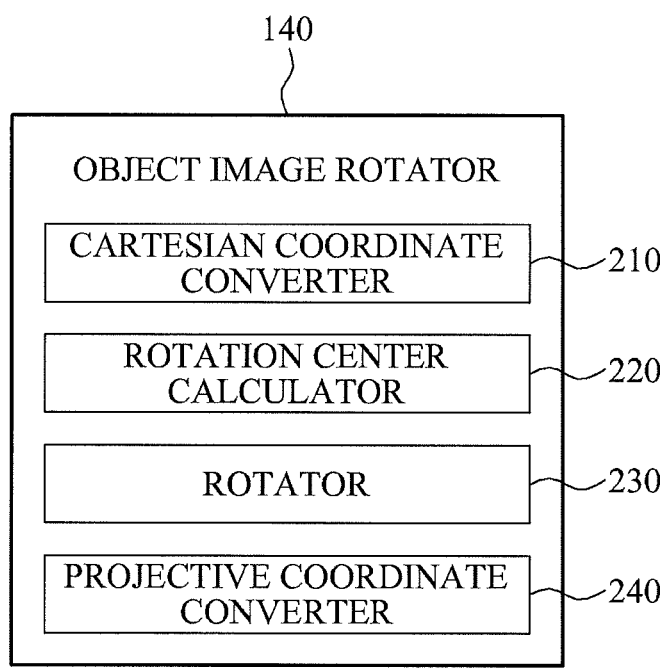
Figure 2B:
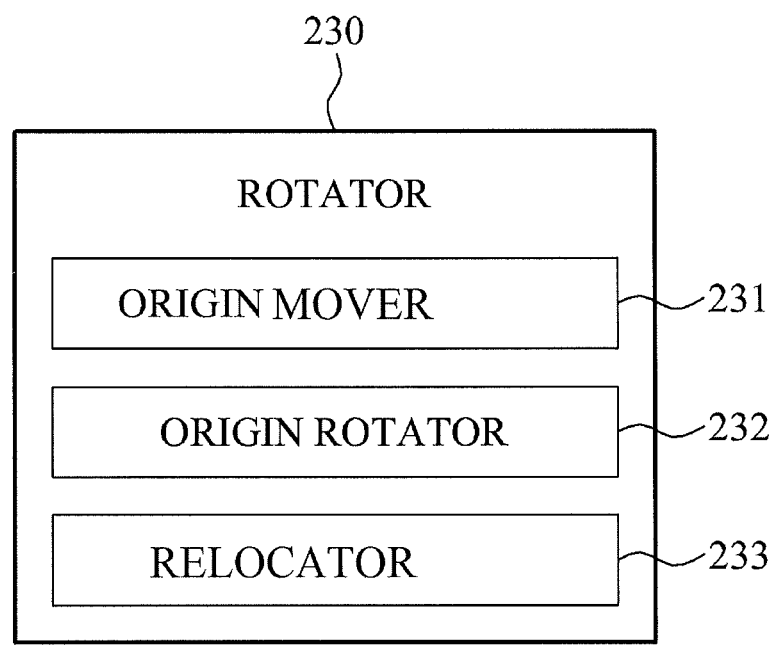
Figure 3:
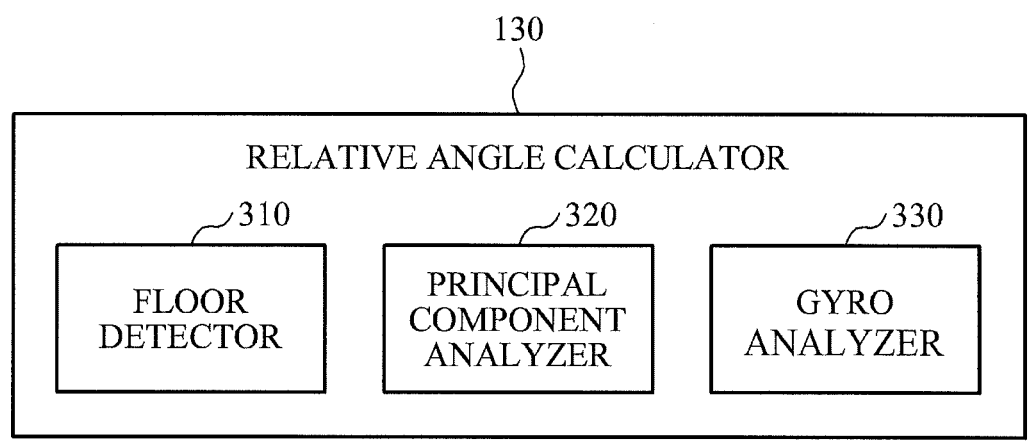

FIGS. 1 to 3 illustrate block diagrams of an image processing apparatus 100 according to one or more embodiments.

Referring to FIG. 1, the image processing apparatus 100 according to one or more embodiments may include a depth image obtainer 110, an object image extractor 120, a relative angle calculator 130, an object image rotator 140, and an object image refiner 150.

The depth image obtainer 110 may obtain a depth image. Here, the depth image may refer to an image that stores information associated with a distance from an object. For example, the image may store information associated with a distance between a two-dimensional (2D) projective plane of a depth image photographing apparatus and the object, as each pixel value.

In this instance, the depth image obtainer 110 may be configured using a variety of methods. For example, the depth image obtainer 110 may include an image sensor used to photograph a depth image, and may obtain the depth image using the image sensor. Also, the depth image obtainer 110 may obtain the depth image by receiving an output of the image sensor separately prepared in a wired or wireless manner.

The object image extractor 120 may extract an object image from the depth image obtained by the depth image obtainer 110. Here, the object image may refer to an image corresponding to a target object. For example, the object image may include a set of pixels corresponding to the target object among a plurality of pixels included in the depth image. Also, the target object may refer to an object in the depth image to be processed, and may include various input objects, for example, a body.

In this instance, the object image extractor 120 may extract the object image using a variety of methods. For example, the object image extractor 120 may include, in the object image, a set of pixels having a depth less than or equal to a predetermined reference depth among a plurality of pixels included in the depth image. Also, the object image extractor 120 may use various conventional object extraction methods.

The relative angle calculator 130 may calculate a relative angle between the target object and the image sensor for use in photographing the depth image, or a relative angle between the image sensor and a background such as a floor. Here, the relative angle may be determined based on a tilt angle of the image sensor, a tilt angle of the target object, the relative angle between the image sensor and the background such as a floor, or a combination thereof.

For example, when the target object is disposed to be vertical relative to a ground surface, and the image sensor photographs the target object at an oblique angle, the image sensor may output the depth image having a relative tilt, and the object image extracted by the object image extractor 120 may also have a relative tilt.

As another example, when the image sensor is fixed to be parallel to the ground surface and the target object is positioned obliquely, the object image may also have a relative tilt.

In addition, when the target object is disposed to be vertical relative to the ground surface having a predetermined tilt and the image sensor photographs the target object at the oblique angle, the object image may also have a relative tilt.

When the object image has the relative tilt, an accuracy of methods for recognizing an object, for example, recognizing a motion of the object and tracking a motion of an object, may decrease.

The depth image processing apparatus 100 may restore the object image using the relative angle calculated by the relative angle calculator 130, which will be described later. Thus, the depth image processing apparatus 100 according to one or more embodiments may provide technology that may enable the image sensor and the target object to be mutually orientation-free.

In particular, the depth image processing apparatus 100 according to one or more embodiments may improve an accuracy of an object recognition method by modifying the relative angle between the image sensor and the target object.

In this instance, the relative angle calculator 130 may be configured using various methods. For example, referring to FIG. 3, the relative angle calculator 130 may include at least one of a floor detector 310, a principal component analyzer 320, and a gyro analyzer 330.

The floor detector 310 may estimate the relative angle between the image sensor and the target object by detecting the floor included in the depth image. The floor detector 310 will be further described with reference to FIGS. 4A through 4D.

The principal component analyzer 320 may estimate the relative angle between the image sensor and the target object by analyzing principal components included in the depth image. Here, the principal component analyzer 320 may use a conventional principal component analysis (PCA) method, for example.

For example, the principal component analyzer 320 may generate a segmentation image based on the depth image, and apply the PCA method to the segmentation image in order to estimate the relative angle.

The gyro analyzer 330 may estimate the relative angle between the image sensor and the target object by using a gyro sensor included in the image sensor.

In this instance, the gyro analyzer 330 may measure a tilt angle of the image sensor using the gyro sensor, and estimate the relative angle between the image sensor and the target object based on the tilt angle of the image sensor. For example, the gyro analyzer 330 may use the measured tilt angle directly as the relative angle between the image sensor and the target object.

The object image rotator 140 may rotate the object image extracted by the object image extractor 120, based on a reference angle and the relative angle calculated by the relative angle calculator 130.

Here, the reference angle may refer to an angle related to reference images prepared in advance to recognize the object image. For example, the reference angle may include a relative angle between the image sensor used to photograph and reference objects corresponding to reference images, and the like. In particular, the reference angle according to one or more embodiments may include an angle at which reference objects are photographed when reference images are generated, and the like.

Depending on a case, the reference angle may include a proper angle for recognizing an object, or an intended rotation angle for use as an indicator in determining a number of degrees to rotate the calculated relative angle. According to one or more embodiments, the reference angle may be expressed by a tuple of (x'-axial direction angle, y'-axial direction angle, z'-axial direction angle), based on three-dimensional (3D) coordinate axes of the image sensor used to photograph reference images.

Hereinafter, for ease of description, reference objects are assumed to be photographed at a front of the image sensor to generate reference images. In this case, a reference angle may be expressed as (0 degrees (°), 0°, 0°).

In this instance, the object image rotator 140 may rotate the object image to match the relative angle to the reference angle. As an example, a relative angle is assumed to be expressed by a tuple of (x-axial direction angle, y-axial direction angle, z-axial direction angle), based on 3D coordinate axes of the image sensor used to photograph the target object, and the relative angle may be (0°, −30°, 0°).

In this case, the object image rotator 140 may rotate the object image by 30° in a y-axial direction to match the relative angle (0°, −30°, 0°) to the reference angle (0°, 0°, 0°).

More particularly, referring to FIG. 2A, the object image rotator 140 according to one or more embodiments may include a Cartesian coordinate converter 210, a rotation center calculator 220, a rotator 230, and a projective coordinate converter 240.

The Cartesian coordinate converter 210 may convert a coordinate system of the object image to a Cartesian coordinate system. In this instance, a depth image output by an image sensor may be provided using projective coordinates. Accordingly, the Cartesian coordinate converter 210 may convert the coordinate system of the depth image to the Cartesian coordinate system that may be used as a reference coordinate system for rotating and moving the object image.

More particularly, the depth image output by the image sensor may be provided in a 2D array structure including a depth of each of pixels. The Cartesian coordinate converter 210 may receive 2D array-structured data, and convert the 2D array-structured data to 3D array-structured data including 3D coordinates of each of pixels. In this instance, the image processing apparatus 100 according to one or more embodiments may convert the 2D array-structured data to 3D array-structured data, and avoid a change in an array scale, which may result from a coordinate conversion or a coordinate rotation.

The rotation center calculator 220 may calculate a rotation center of the object image in the Cartesian coordinate system. In this instance, the rotation center calculator 220 may calculate the rotation center of the object image using Equation 1.

$$\text{middle\_point}(x, y, z) = \frac{1}{\text{num}(x, y, z)} \sum_{N=0}^{\text{Total}} \text{objectCoordinate}(x, y, z) \quad \text{[Equation 1]}$$

In Equation 1, middle_point (x, y, z) denotes the rotation center of the object image, objectCoordinate (x, y, z) denotes x, y, and z coordinate values of points included in an image object area, and num (x, y, z) denotes a number of the x, y, and z coordinate values of points included in the image object area. Here, the x, y, and z coordinate values refer to coordinate values of the Cartesian coordinate system.

The rotator 230 may rotate the object image to match the relative angle of the object image to the reference angle in the Cartesian coordinate system.

More particularly, referring to FIG. 2B, the rotator 230 may include an origin mover 231, an origin rotator 232, and a relocator 233.

The rotator 230 may move the object image to position a rotation center of the object image at an origin of the Cartesian coordinate system.

The origin rotator 232 may three-dimensionally rotate the object image on the origin of the Cartesian coordinate system using a rotation matrix. In this instance, the origin rotator 232 may rotate the object image using Equation 2 to match the relative angle of the object image to the reference angle.

[Equation 2]

$$R_z(\psi)R_y(\theta)R_x(\phi) =$$

$$\begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

In Equation 2, φ denotes a rotation angle with respect to a x-axis, θ denotes a rotation angle with respect to a y-axis, and ψ denotes a rotation angle with respect to an z-axis.

For example, when the relative angle calculated by the relative angle calculator 130 is expressed as (30°, 10°, −15°) and the reference angle is expressed as (0°, 0°, 0°), the origin rotator 232 may rotate a target object by (−30°, −10°, 15°) using Equation 2.

The image processing apparatus 100 according to one or more embodiments may prevent an appearance of the rotated object image from being distorted by rotating the object image in the Cartesian coordinate system.

The relocator 233 may relocate the object image to position the rotation center at original coordinates in the Cartesian coordinate system.

In general, an object recognition algorithm may be designed based on a projective coordinate system that may be included in a coordinate system of a depth image sensor. The projective coordinate converter 240 may convert a coordinate system of the object image rotated by the rotator 230 to the projective coordinate system.

In this instance, the projective coordinate converter 240 may receive 3D array-structured data including 3D coordinates of each of pixels, and convert the 3D array-structured data to 2D array-structured data suitable for a process of refining an object image using the object image refiner 150.

The object image refiner 150 may refine the object image rotated by the object image rotator 140.

More particularly, the rotated object image may include empty spaces. For example, the depth image may include a target object tilted 45° relative to a projective plane of the image sensor.

In this example, the object image rotator 140 may rotate the target object by −45°, and match the relative angle to the reference angle of 0°. However, an entirety of the rotated object image may not be represented using only information associated with the object image before rotation. For example, an occluded portion of the object image before rotation may no longer be occluded in the rotated object image.

Accordingly, the object image refiner 150 may fill the empty spaces included in the rotated object image using an interpolation method, a filtering method, and the like.

In this instance, the object image refiner 150 may apply the interpolation method to the 2D array-structured data that is three-dimensionally rotated and reconverted to the project coordinates, and fill the empty spaces included in the rotated object image.

For example, in the rotated object image, the object image refiner 150 may detect a closed curve that is less than or equal to a predetermined scale, and apply a mean filter or a Gaussian filter.

Accordingly, the image processing apparatus 100 according to one or more embodiments may rotate an object image to a proper angle for recognizing a target object and may refine empty spaces formed due to coordinate conversion and rotation of the object image.

FIGS. 4A to 4D illustrate diagrams describing an operation of the floor detector 310 according to one or more embodiments.

Although not illustrated in FIGS. 4A to 4D, the floor detector 310 may include a floor pixel extractor, a floor equation calculator, and a relative angle estimator.

The floor pixel extractor may extract floor pixels corresponding to a floor from a depth image 401, the floor equation calculator may calculate a floor equation based on the floor pixels, and the relative angle estimator may estimate a relative angle between an image sensor and a target object based on the floor equation.

Figure 4A:
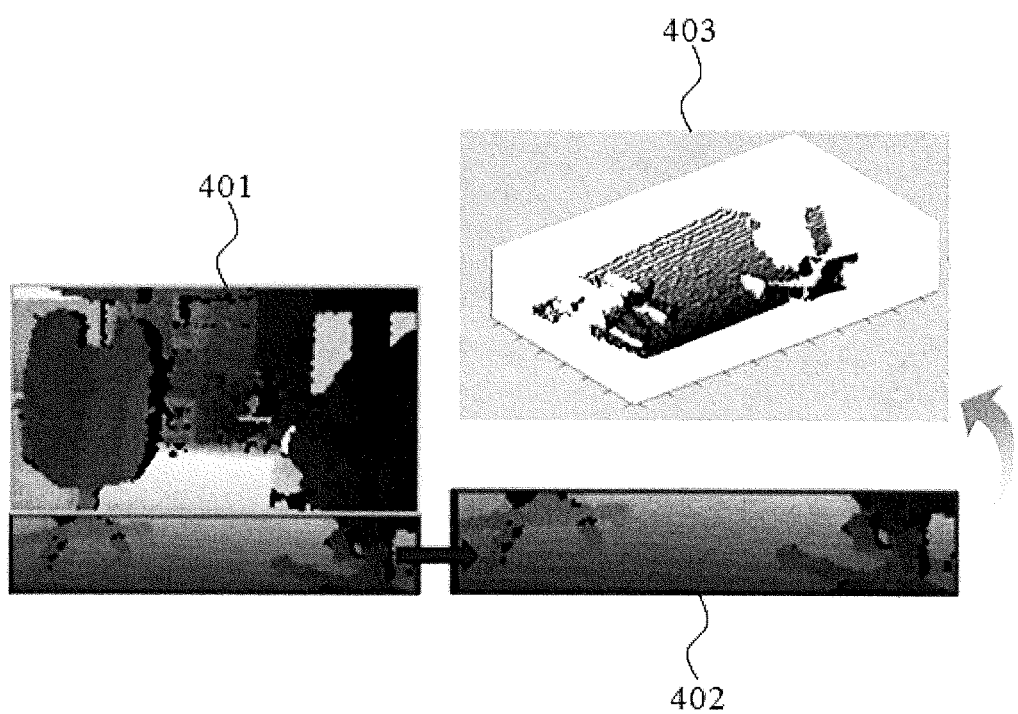
FIGS. 4A to 4D illustrate diagrams describing an operation of a floor detector according to one or more embodiments.

More particularly, referring to FIG. 4A, the floor pixel extractor may obtain the depth image 401. The floor pixel extractor may extract a predetermined ratio of a bottom portion in the depth image 401. Hereinafter, for ease of description, the predetermined ratio for extracting the floor pixels is assumed to be 1/4.

The floor pixel extractor may extract one quarter of the lower end portion in the depth image 401, and transfer an extracted quarter depth image 402 to the floor equation calculator. The floor equation calculator may generate a 3D arrangement image 403 by arranging a plurality of pixels included in the extracted quarter depth image 402 in a 3D space.

Figure 4B:
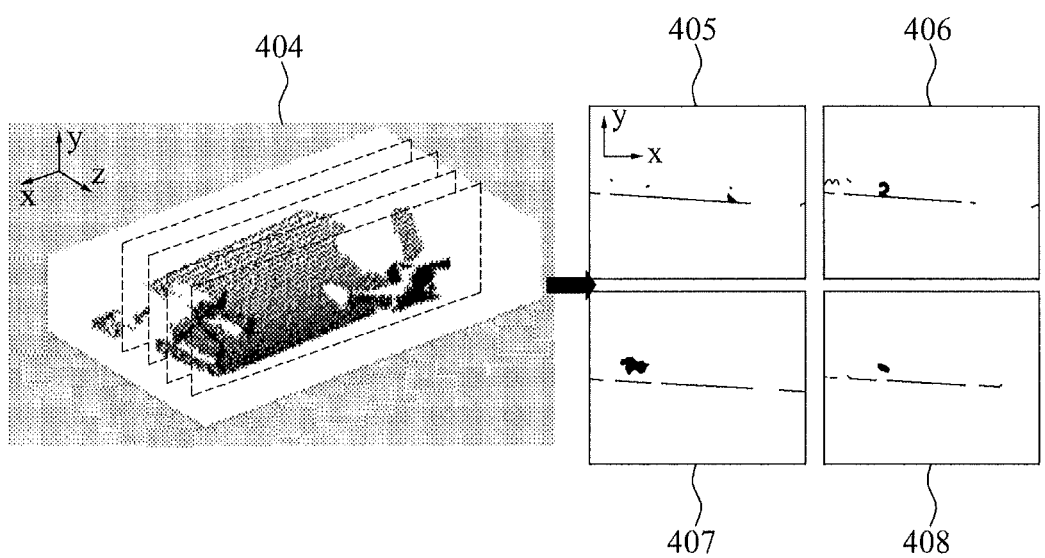

Referring to FIG. 4B, the floor equation calculator may project, onto a predetermined set of planes, the plurality of pixels arranged in the 3D space, in the 3D arrangement image 403 of FIG. 4A.

The predetermined set of planes may include a plurality of parallel planes. Hereinafter, for ease of description, the predetermined set of planes is assumed to include four planes 405, 406, 407, and 408. Depending on cases, the predetermined set of planes may include four planes, however, additional or a fewer number of planes may be used.

The floor equation calculator may project each of the plurality of pixels arranged in the 3D space to one of the four planes 405, 406, 407, and 408. A 3D arrangement image 404 is a graph provided to intuitively describe an operation of the floor equation calculator. The floor equation calculator may determine a location of each plane on a Z-axis of the 3D space.

In this instance, the floor equation calculator may project each of the plurality of pixels arranged in the 3D space from corresponding pixel to the closest plane among the four planes 405, 406, 407, and 408.

Figure 4C:
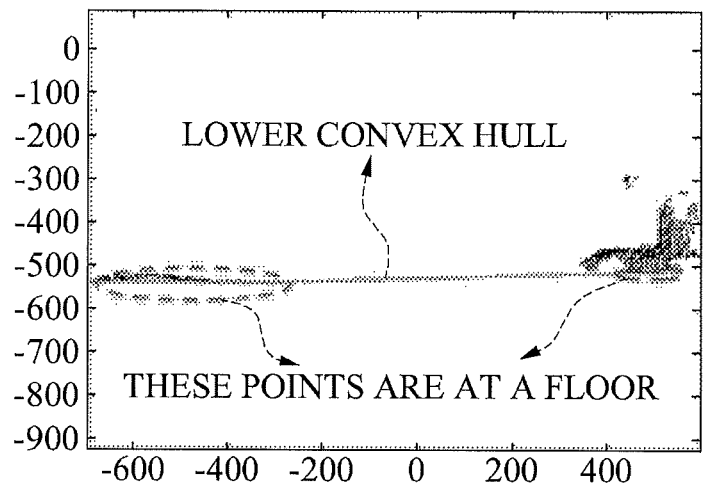

Referring to FIG. 4C, the floor equation calculator may detect floor pixels corresponding to a floor from among pixels projected to each plane included in the predetermined set of planes. If the number of planes included in the predetermined set of planes is N, Zk may denote a k-th plane. Here, k is an integer greater than or equal to 1, and smaller than or equal to N. For example, the four planes 405, 406, 407, and 408 may be denoted by Z1, Z2, Z3, and Z4, respectively.

In each plane Zk, the floor equation calculator may estimate a lower convex hull of the pixels projected to each plane Zk using a Graham scan algorithm. The floor equation calculator may detect pixels close to the estimated lower convex hull as the floor pixels.

In addition, the floor equation calculator may calculate the floor equation using the floor pixels.

More particularly, the floor equation calculator may calculate a floor equation of Y=aX+bZ+c based on values of 3D coordinates (xi, yi, zi) of an $i^{th}$ floor pixel Xi. In this instance, the floor equation calculator may calculate a, b, and c that minimize a value of a mean square estimation based on Equation 3.

$$\sum_i (ax_i + bz_i + c - y_i)^2 \qquad \text{[Equation 3]}$$

Figure 4D:
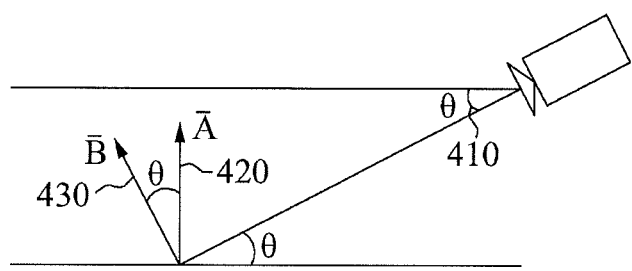

Referring to FIG. 4D, the relative angle estimator may estimate the relative angle between the image sensor and the target object based on the floor equation.

For example, when the image sensor is tilted by a value of θ 410 in a y-axial direction, the relative angle estimator may calculate the value of θ 410 based on Equation 4.

$$\cos\theta = \frac{\vec{A} \cdot \vec{B}}{\|A\|\|B\|} \qquad \text{[Equation 4]}$$

In Equation 4, $\vec{A}$ denotes a floor normal vector 420, and $\vec{B}$ denotes a y-axial vector 430 of the image sensor. The floor normal vector 420 may be obtained based on a vector (a, b, c) that is a normal vector of the floor equation Y, and the y-axial vector 430 of the image sensor may be a vector (0, 1, 0).

FIGS. 5A to 5D illustrate diagrams describing a result of processing a depth image according to one or more embodiments.

Figure 5A:
FIGS. 5A to 5D illustrate images describing a result of processing a depth image according to one or more embodiments.

Referring to FIG. 5A, a depth image obtainer may obtain the depth image. In this instance, the target object may indicate an upper body of a person raising a left hand at a shoulder-height and fully extending fingers with an open palm.

Figure 5B:
Figure 5C:
Figure 5D:

An object image extractor may extract an object image of FIG. 5B from the depth image of FIG. 5A. When a relative angle calculator calculates a relative angle between the target object and the image sensor, an object image rotator may rotate the object image of FIG. 5B and output a result of FIG. 5C.

As described above, the rotated object image of FIG. 5C may include empty spaces. Accordingly, an object image refiner may refine the rotated object image of FIG. 5C, and output a result image of FIG. 5D.

Figure 6:
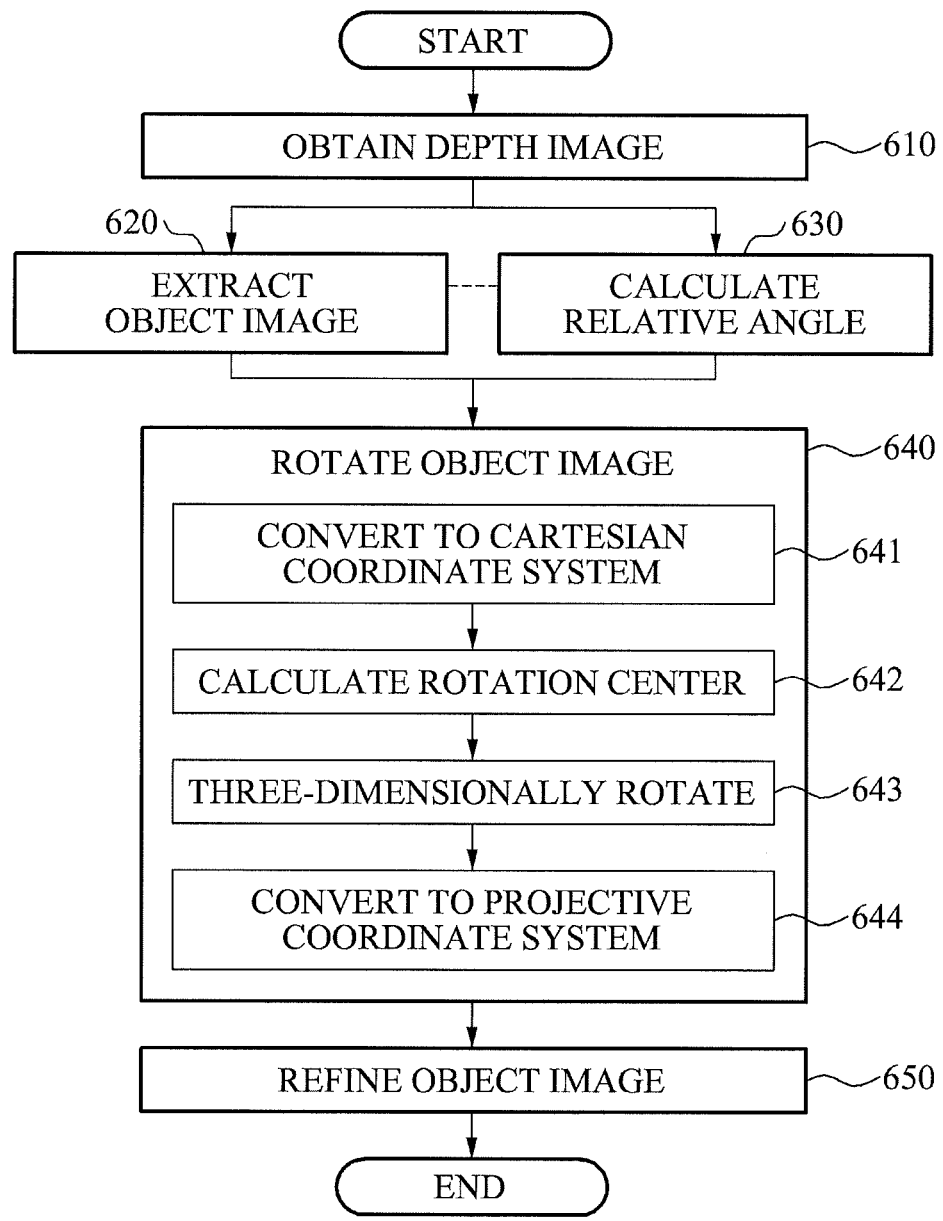
FIG. 6 illustrates a method of processing a depth image according to one or more embodiments.

FIG. 6 illustrates a method of processing a depth image according to one or more embodiments.

Referring to FIG. 6, a depth image may be obtained in operation 610. In operation 620, an object image may be extracted. In operation 630, a relative angle may be calculated between a background and an image sensor used to photograph a target object, or between the image sensor and a target object.

In operation 640, the object image may be rotated based on the relative angle and a reference angle. In operation 641, a coordinate system of the object image may be converted to a Cartesian coordinate system. In operation 642, a rotation center of the object image may be calculated. In operation 643, the object image may be rotated to match the relative angle to the reference angle. In operation 644, the coordinate system of the rotated object image may be reconverted to a projective coordinate system. Since calculation of the relative angle between the background and an image sensor used to photograph, or between the image sensor and a target object may not be performed based on a variable value changed for each input frame, the calculation may performed only once initially, or performed once for each predetermined frame.

In operation 650, to refine the rotated object image, empty spaces included in the rotated object image may be filled using at least one of an interpolation method and a filtering method.

Descriptions related to FIGS. 1 to 5D may be applied to operations illustrated in FIG. 6 and thus, further detailed description will be omitted.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus for processing a depth image, the apparatus comprising:
  a processor configured to:
    obtain a depth image;
    extract an object image from the depth image;
    calculate a relative angle between an image sensor used to photograph the depth image and a target object corresponding to the object image;
    rotate the object image based on the relative angle and a reference angle, the reference angle being related to reference images prepared in advance to recognize the object image; and
    fill empty spaces comprised in the rotated object image based on at least one of an interpolation method and a filtering method,
    wherein the relative angle is determined based on a normal vector of a floor included in the depth image.

2. The apparatus of claim 1, wherein the reference angle comprises an angle between the image sensor used to photograph the reference images and reference objects corresponding to the reference images.

3. The apparatus of claim 1, wherein, to rotate the object image based on the relative angle and the reference angle, the processor is further configured to:
  convert a coordinate system of the object image to a Cartesian coordinate system;
  calculate a rotation center of the object image in the Cartesian coordinate system;
  rotate the object image on the rotation center to match the relative angle to the reference angle in the Cartesian coordinate system; and
  convert the coordinate system of the object image to a projective coordinate system.

4. The apparatus of claim 3, wherein, to rotate the object image based on the relative angle and the reference angle, the processor is further configured to:
  move the object image to position the rotation center at an origin of the Cartesian coordinate system;
  three-dimensionally rotate the object image on the origin using a rotation matrix; and
  relocate the object image to position the rotation center at original coordinates.

5. The apparatus of claim 3, wherein the object image is represented by a two-dimensional (2D) array in the projective coordinate system, and the object image is represented by a three-dimensional (3D) array in the Cartesian coordinate system.

6. The apparatus of claim 1, wherein the processor is further configured to:
  refine the rotated object image.

7. The apparatus of claim 1, wherein, to calculate the relative angle between the image sensor and the target object, the processor is further configured to at least one of:

estimate the relative angle by applying a y-axial vector of the image sensor to the normal vector;
estimate the relative angle by analyzing principal components included in the depth image; and
estimate the relative angle by using a gyro sensor comprised in the image sensor.

8. The apparatus of claim 7, wherein, to estimate the relative angle by applying a y-axial vector of the image sensor to the normal vector, the processor is further configured to:
extract floor pixels corresponding to the floor from the depth image;
calculate a floor equation based on the floor pixels; and
determine the normal vector of the floor based on a mean square estimation of the floor equation.

9. A method of processing a depth image, the method comprising:
obtaining a depth image;
extracting an object image from the depth image;
calculating a relative angle between an image sensor used to photograph the depth image and a target object corresponding to the object image;
rotating the object image based on the relative angle and a reference angle, the reference angle being related to reference images prepared in advance to recognize the object image; and
filling empty spaces included in the rotated object image based on at least one of an interpolation method or a filtering method to refine the rotated object image,
wherein the relative angle is determined based on a normal vector of a floor included in the depth image.

10. The method of claim 9, wherein the rotating comprises:
converting a coordinate system of the object image to a Cartesian coordinate system;
calculating a rotation center of the object image in the Cartesian coordinate system;
rotating the object image on the rotation center so that the relative angle is matched to the reference angle in the Cartesian coordinate system; and
converting the coordinate system of the object image to a projective coordinate system.

11. The method of claim 10, wherein the object image is represented by two-dimensional array in the projective coordinate system, and the object image is represented by three-dimensional array in the Cartesian coordinate system.

12. The method of claim 9, wherein the calculating comprises at least one of:
estimating the relative angle by applying a y-axial vector of the image sensor to the normal vector;
estimating the relative angle by analyzing principal components included in the depth image; and
estimating the relative angle based on a gyro numerical value included in the image sensor.

13. A non-transitory computer-readable medium comprising a program for instructing a computer to perform the method of claim 9.

14. A method of processing a depth image, the method comprising:
obtaining a depth image;
extracting an object image from the depth image;
calculating a relative angle between an image sensor used to photograph the depth image and a target object corresponding to the object image;
rotating the object image based on the relative angle and a reference angle; and
filling empty spaces included in the rotated object image based on at least one of an interpolation method or a filtering method to refine the rotated object image,
wherein the relative angle is determined based on a normal vector of a floor included in the depth image.

15. The method of claim 14, wherein the rotating comprises:
converting a coordinate system of the object image to a Cartesian coordinate system;
calculating a rotation center of the object image in the Cartesian coordinate system;
rotating the object image on the rotation center so that the relative angle is matched to the reference angle in the Cartesian coordinate system; and
converting the coordinate system of the object image to a projective coordinate system.

16. The method of claim 14, wherein the calculating comprises at least one of:
estimating the relative angle by applying a y-axial vector of the image sensor to the normal vector;
estimating the relative angle by analyzing principal components included in the depth image; and
estimating the relative angle based on a gyro numerical value included in the image sensor.

17. The method of claim 14, wherein the reference angle is related to reference images prepared in advance to recognize the object image.

18. The apparatus of claim 1, wherein, to rotate the object image based on the relative angle and the reference angle, the processor is further configured to rotate the object image based on the relative angle and the reference angle by rotating the object image to make the relative angle equivalent to the reference angle.

19. The apparatus of claim 1, wherein the reference angle and the relative angle comprise information indicating an angular direction to each 3D coordinate axis.

20. The apparatus of claim 1, wherein the reference angle is a second relative angle between an image sensor and a reference object when a reference image is prepared.

* * * * *